United States Patent [19]

McMahon

[11] Patent Number: 5,182,832
[45] Date of Patent: Feb. 2, 1993

[54] AIR FILTER CLEANING APPARATUS

[76] Inventor: Michael R. McMahon, 3819 Smoketree Way - 232, Phelan, Calif. 92371

[21] Appl. No.: 874,408

[22] Filed: Apr. 27, 1992

[51] Int. Cl.⁵ ............................................. A47L 5/14
[52] U.S. Cl. ..................................... 15/304; 55/294
[58] Field of Search ............... 55/294, 302; 15/304, 15/318, 316.7

[56] References Cited

U.S. PATENT DOCUMENTS 3,733,639  5/1973  Timian ................................. 15/304
3,958,296  5/1976  Fell ..................................... 15/304

Primary Examiner—Charles Hart
Attorney, Agent, or Firm—Brown, Martin, Haller and McClain

[57] ABSTRACT

An inlet tube has a connector at one end for coupling to an air supply hose, and a rotary head is rotatably mounted on the other end of the inlet tube. The rotary head has an internal air distribution chamber connected to the inlet tube and small outlet openings in its outer peripheral wall for spraying air from the chamber towards an air filter unit. Rotor or spin outlet passageways in the peripheral wall are arranged at an angle to cause the head to spin in a turbine-like fashion when air flow is directed from the chamber and out through the passageways. The rotating head sprays air outwardly across the surface of an air filter unit to dislodge dirt from filter paper in a filter unit.

8 Claims, 1 Drawing Sheet

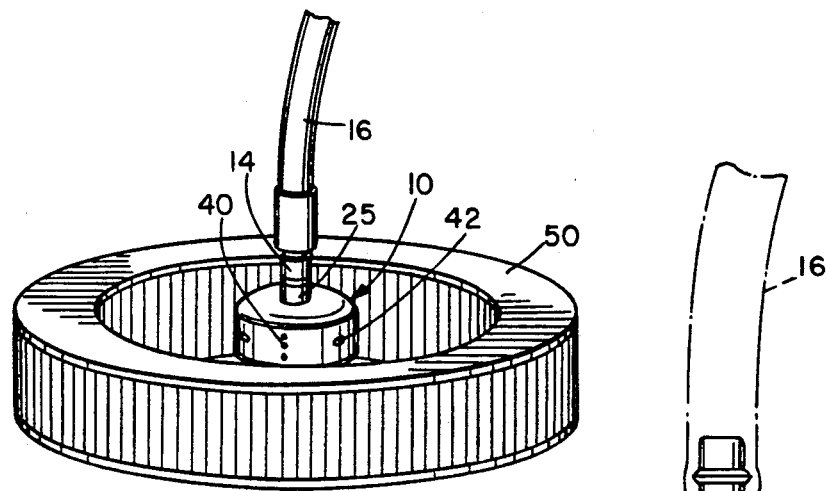
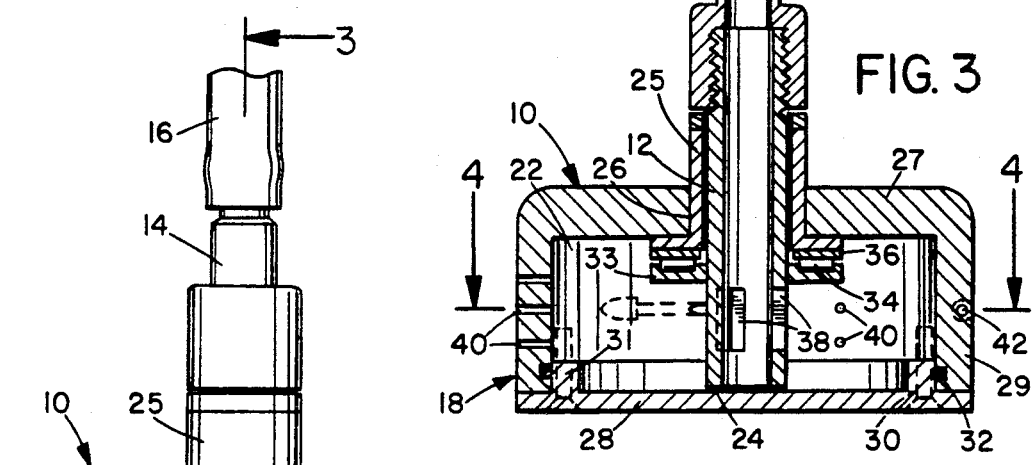
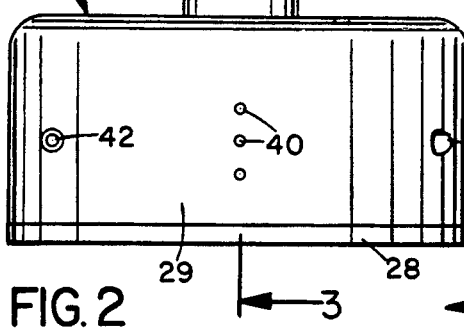
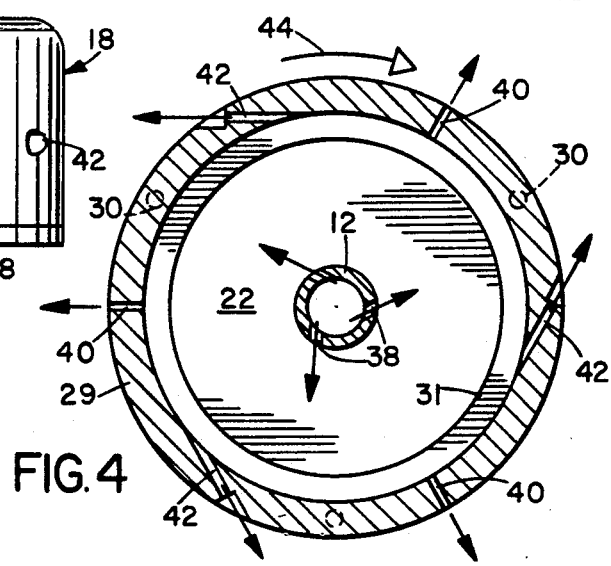
FIG. 1
FIG. 2
FIG. 3
FIG. 4

AIR FILTER CLEANING APPARATUS

BACKGROUND OF THE INVENTION

The present invention relates generally to apparatus for cleaning filter elements and is particularly concerned with an apparatus for cleaning the air filters of automobiles and other types of vehicles or industrial engines.

Automobiles and other vehicles and machines having similar engines typically employ folded paper types of air cleaners for filtering dust and other particles from air entering the engine. In ordinary use these filters become clogged with accumulated dust and dirt, and need cleaning or replacement on a regular basis. When the engine is in use under extreme conditions, for example vehicles used in a desert or an otherwise extremely dusty environment, frequent replacement or cleaning of the filters is needed. Since replacement is relatively expensive, it would be advantageous if the folded paper filter could be cleaned effectively to avoid the need for frequent replacement.

In the past, folded paper air filters for engines of various types have often simply been replaced when clogged, involving significant expense, or have been cleaned simply by directing an air hose at the filter element to blow out any loose particles or dust. However, the air blast from a standard high pressure air line is so powerful that it often damages the relatively fragile filter paper, requiring replacement. U.S. Pat. No. 3,733,639 of Timian describes such an arrangement, in which the filter unit is placed in an enclosure and an air hose extends into the enclosure into the center of the filter unit. A revolving air distributer in the form of a tubular element directed towards the filter element is connected to the inner end of the air line. Thus, a powerful blast of air is directed against the inner side of the annular filter element.

SUMMARY OF THE INVENTION

It is an object of the present invention to provide a new and improved air filter cleaning apparatus.

According to the present invention, an air filter cleaning apparatus is provided which comprises an inlet tube having a connector at one end for connecting the tube to an air supply hose, and an enlarged rotary head rotatably mounted on the opposite, outlet end of the tube. The rotary head has an internal air distribution chamber connected to the outlet end of the tube, and at least one distribution outlet on the outer periphery of the head for directing air flow towards an air filter unit.

The head includes a rotor arrangement for re-directing air flow through the head so that the head is rotated relative to the inlet tube and air flow from the outlets is directed across the entire area of an annular air filter unit surrounding the head. In one embodiment of the invention, the rotor arrangement comprises a series of angled rotor passageways in the peripheral wall of the chamber for directing air flow in a circular path from the chamber and thus spinning the head in the opposite direction to the air flow, in a turbine-like manner. The head is preferably cylindrical and the chamber is hollow, and the rotor passageways extend in a generally tangential direction relative to the chamber. In an alternative embodiment, the chamber may have internal baffles arranged so that incoming air impinging on the baffles causes the head to rotate and direct air to all areas of a surrounding filter unit. The air outlets preferably extend radially outwardly from the chamber to direct air onto a surrounding annular air filter, for example. Preferably, air is directed in a circular path from the air inlet tube into the chamber, to reduce its velocity, and the air outlets are relatively small to produce a further reduction in the air flow velocity. By reducing the air flow and directing it out of a number of small outlets, the device can be connected to a standard high pressure air line while risk of damage to the filter paper of the air filter unit is reduced. At the same time, the variation in air pressure against the pleated or folded paper of the air filter unit as the head rotates will cause flapping of the paper, tending to dislodge any dirt or dust so that it can be blown off relatively easily.

This allows an engine air filter to be cleaned without damaging the filter, using a standard air hose with the rotating head attached to diffuse the air flow and reduce the air velocity so that the relatively fragile filter paper is not damaged. This extends the lifetime of both vehicular and industrial engine filter units substantially, reducing maintenance costs and conserving materials.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 1 illustrates the air filter cleaner according to a preferred embodiment of the invention in operation position in a typical air filter;

FIG. 2 is an enlarged side elevation view of the air filter cleaner unit;

FIG. 3 is a sectional view taken on line 3—3 of FIG. 2; and

FIG. 4 is a sectional view taken on line 4—4 of FIG. 3.

DESCRIPTION OF THE PREFERRED EMBODIMENT

An air filter cleaner 10 according to a preferred embodiment of the present invention is illustrated in the drawings. The apparatus basically comprises an inlet tube or stem 12 having a standard air hose connector 14 at one end for connection to an air hose 16, and a rotary air distribution or diffuser head 18 rotatably mounted on the opposite end of the stem 12.

Head 18 is preferably cylindrical or disc-shaped and has a hollow internal air distribution chamber 22 into which the end 24 of the stem projects through a bushing 25 mounted in an opening 26 in one end wall 27 of head 18. The opposite end of chamber 22 is closed by means of a removable end plate 28 which is releasably secured to the outer cylindrical peripheral wall 29 of the chamber by three equally spaced screws 30, as best illustrated in FIG. 3 End plate 28 has an annular projecting rim 31 which projects into chamber 22 and seals against O-ring seal 32 on the opposing inner face of the peripheral wall 29 to prevent air leakage from the chamber. Inlet tube 12 has an annular flange 33 within chamber 22 with upwardly-facing, annular indent in which a radial roller bearing 34 is seated. Bushing 25 rotatably engages roller bearing 34 through thrust washer 36 to allow the head to rotate smoothly on the stem.

The stem or inlet tube 12 has three equally spaced air inlet openings 38 spaced around its periphery for directing air into the chamber 22, as best illustrated in FIG. 4.

These openings are directed at an angle to the radial direction, so that air is directed in a generally circular path into the chamber, where it will swirl around, reducing its velocity. The outer peripheral wall 29 of the chamber has three equally spaced sets of small, radial air outlets 40 equally spaced around its periphery, each set comprising a vertical row of three small outlets, as best illustrated in FIGS. 2 and 3. Three equally spaced rotor outlet passageways 42 are also provided in the outer wall 29, with each rotor outlet passageway being positioned between respective pairs of air outlets 40. The air outlets extend in a generally radial direction, while the rotor outlet passageways are directed generally tangentially relative to the outer periphery of the air chamber 22, so as to direct air flow out of the chamber in a generally circular, anti-clockwise path. This in turn will have a rotor effect causing the head 18 to spin in a clockwise direction on the stem, in the direction of the arrow 44 in FIG. 4.

The air outlet openings 40 are relatively small, and preferably of the order of 1/16 inch in diameter, so that the air flow velocity will be substantially reduced when passing from chamber 22 out of openings 40. Rotor outlet passageways 42 are of similar diameter to air outlet openings 40.

FIG. 1 illustrates the air filter cleaner 10 in an operating position at the center of a typical vehicle air filter 50. Such air filters typically have pleated filter paper 52 for filtering air entering the engine, and this paper becomes soiled and clogged with repeated use, necessitating regular cleaning or replacement. In order to clean such filter paper, the inlet tube 12 is first coupled to a standard air hose via connector 14, and the head 18 is positioned at the center of filter 50. When the air supply is turned on, air will flow into chamber 22 via inlet openings 38 and will be directed radially outwardly through air outlets 40 and tangentially outwardly through rotor outlet passageways 42, as indicated by the arrows in FIG. 4.

High pressure air flowing into the chamber and out through the angled rotor outlets will in turn cause the head to spin in a manner similar to a turbine, so that the air spraying radially from outlets 40 directly towards the filter paper 52 will travel across the entire annular inner surface of the paper 52. This arrangement will achieve spin velocities of 1200 to 1500 revolutions per minute when connected to a standard automobile service station air hose outlet. The small diameter outlets 40 will significantly reduce the air velocity so that the relatively fragile filter paper will not be damaged, but at the same time the air spray will blow off any loose dirt. The change in air pressure as the air outlets move across the surface of the filter will cause the paper to flap, tending to dislodge any dirt clinging to the paper so that it can also be blown off.

It will be understood that the cleaner apparatus can be used for cleaning filter units of other shapes and sizes than that illustrated in FIG. 1, and also for cleaning industrial filters as well as vehicle filters. The cleaner head may be physically moved across the surface of a filter while it is spinning, if necessary, for example to cover the entire surface area of a longer filter than that illustrated or a rectangular unit, for example.

Although a preferred embodiment of the present invention has been described above by way of example only, it will be understood by those skilled in the field that modifications may be made to the disclosed embodiment without departing from the scope of the invention, which is defined by the appended claims.

I claim:

1. Air filter cleaning apparatus, comprising:
   an inlet tube having connector means at one end for connection to an air hose;
   an enlarged head rotatably mounted at the opposite end of the inlet tube, the head having an outer peripheral wall enclosing an internal air distribution chamber, the chamber being connected to said inlet tube, and the outer peripheral wall having a plurality of outlets spaced around its periphery for directing air out of the chamber towards an air filter unit; and
   said head including rotor means for re-directing air in a direction to cause rotation of said head relative to said inlet tube.

2. The apparatus as claimed in claim 1, wherein said chamber is a hollow chamber and said rotor means comprises at least one angled outlet in said peripheral wall which is angled relative to the direction of air flow into said chamber to direct air in a generally circular path from said chamber so that said head rotates in the opposite direction to said air flow.

3. The apparatus as claimed in claim 2, wherein said peripheral wall is cylindrical and has a plurality of radial outlets for directing air flow towards an air filter, and a plurality of generally tangentially directed, angled outlets comprising said rotor means.

4. The apparatus as claimed in claim 1, wherein said inlet tube has a plurality of openings spaced around its periphery adjacent said opposite end for directing air into said chamber.

5. The apparatus as claimed in claim 4, wherein said openings are angled in a non-radial direction relative to said inlet tube.

6. The apparatus as claimed in claim 1, wherein said outlets comprise at least three equally spaced sets of outlets in said peripheral wall, each set of outlets comprising a plurality of spaced outlet openings arranged in a line extending parallel to the longitudinal axis of said inlet tube.

7. The apparatus as claimed in claim 6, wherein each set of outlet openings comprises a line of three openings.

8. The apparatus as claimed in claim 1, wherein said head comprises a first, cup-shaped part rotatably mounted on said inlet tube and having an open end, and a second, closure plate releasably mounted on the open end of the cup-shaped part.

* * * * *